W. C. H. WEFEL.
RAILWAY SIGNALING SYSTEM.
APPLICATION FILED NOV. 27, 1918.
1,366,107.
Patented Jan. 18, 1921.
3 SHEETS—SHEET 1.
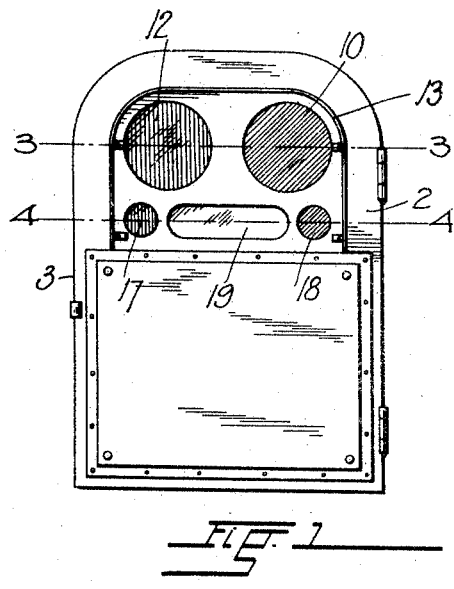
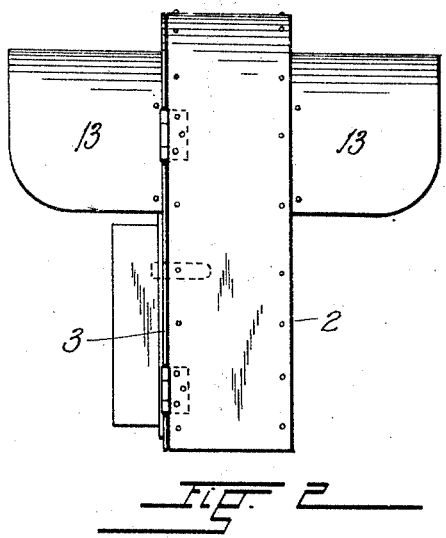
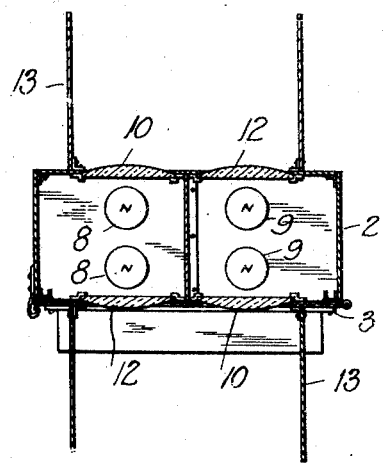
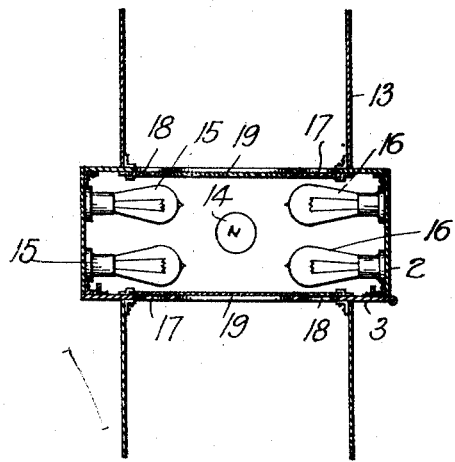
INVENTOR.
W. C. H. Wefel.
BY
ATTORNEY.

W. C. H. WEFEL.
RAILWAY SIGNALING SYSTEM.
APPLICATION FILED NOV. 27, 1918.
1,366,107.
Patented Jan. 18, 1921.
3 SHEETS—SHEET 2.
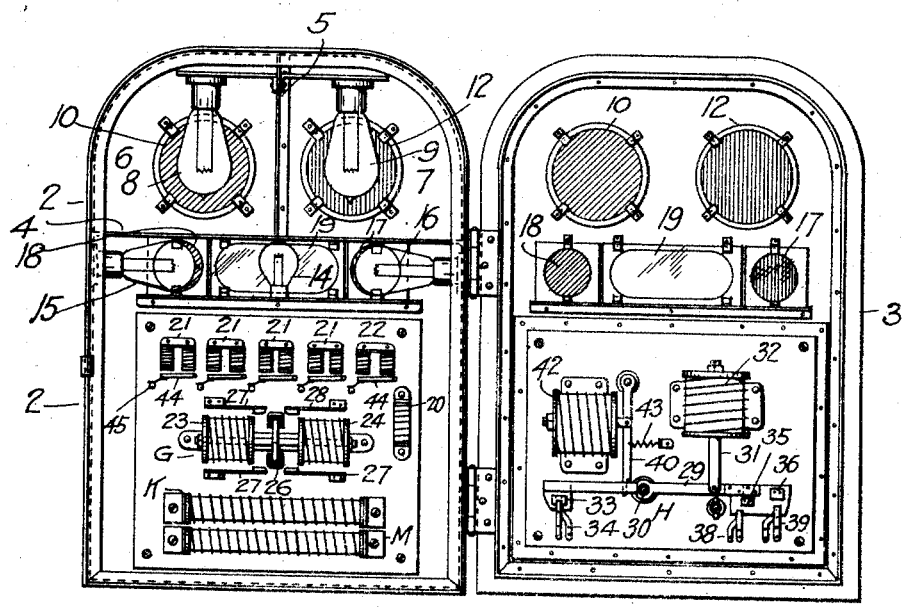
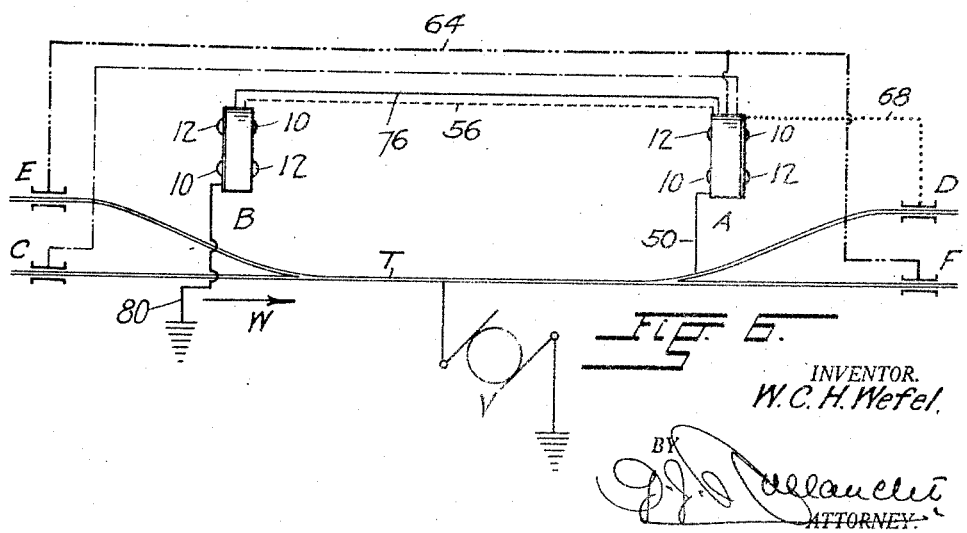
INVENTOR.
W. C. H. Wefel,
BY
ATTORNEY

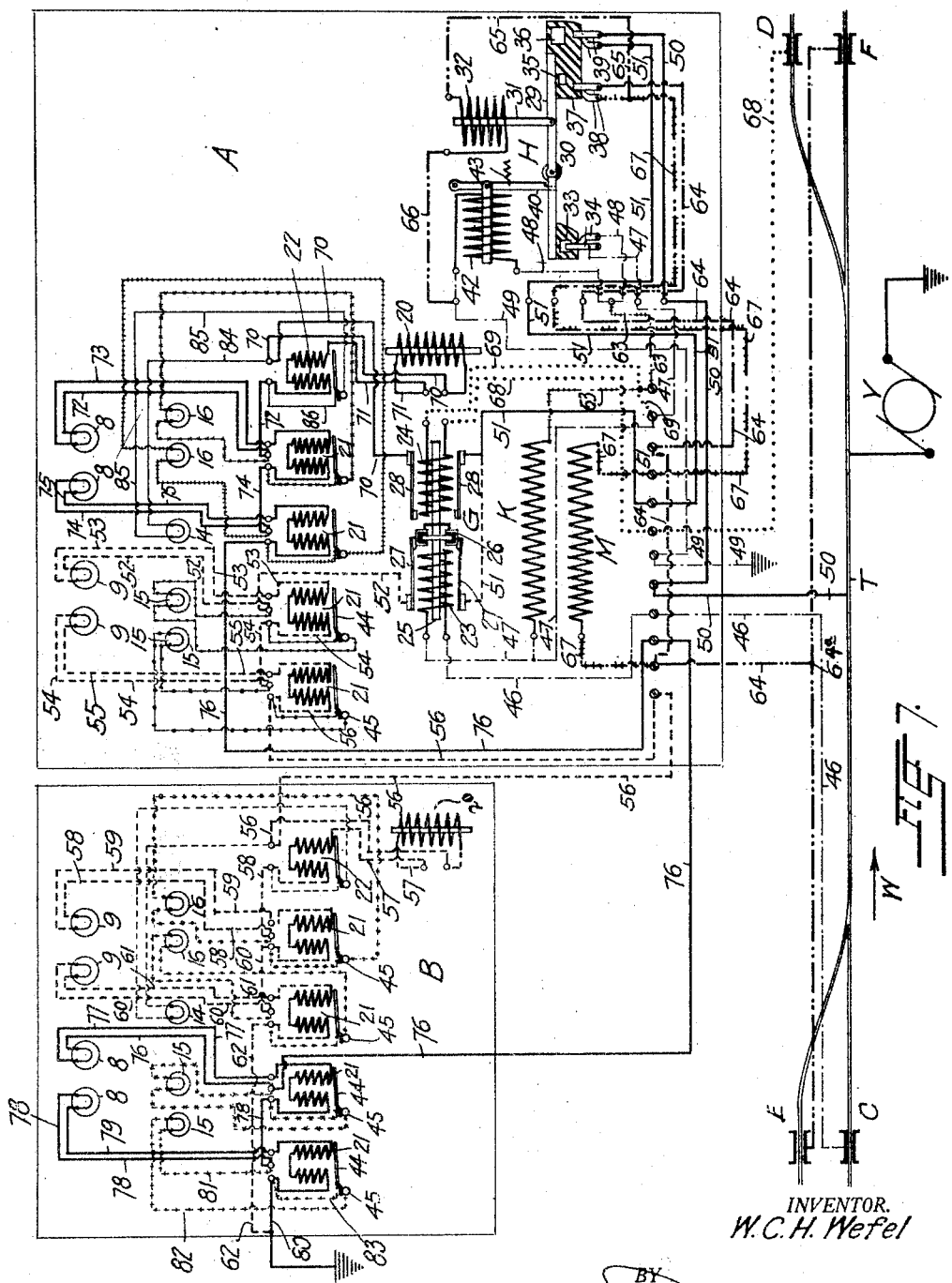

UNITED STATES PATENT OFFICE.

WILLIAM C. H. WEFEL, OF DENVER, COLORADO.

RAILWAY SIGNALING SYSTEM.

1,366,107.  Specification of Letters Patent.  Patented Jan. 18, 1921.

Application filed November 27, 1918. Serial No. 264,355.

*To all whom it may concern:*

Be it known that I, WILLIAM C. H. WEFEL, a citizen of the United States, residing at Denver, in the county of Denver and State of Colorado, have invented certain new and useful Improvements in Railway Signaling Systems, of which the following is a specification.

This invention relates to railway signaling systems and more particularly to signaling systems of the type used on electric street railways to prevent cars from entering a single track- or switch-section while the same is occupied by a car coming from the opposite direction.

In a system of this character, signal boxes are placed in an elevated position at opposite ends of the track section, in electric connection with so-called contactors which operate to close and reopen the circuits of incandescent lamps in the signal boxes by engagement with the trolley-wheels of passing cars.

The signal boxes are usually provided with lenses of two distinctive colors, preferably red and green, to indicate to motormen of cars approaching a single-track section between lines of double track, or a switch-section between lines of single track, whether or not it is occupied by a car coming from the opposite direction.

It is the primary object of the present invention to provide in a signaling system of the above-described character, secondary lamps in circuits which are automatically closed when the current flow through corresponding primary lamps in the signaling boxes is interrupted by rupture of their filaments, or other causes.

In association with these secondary lamps, means are provided which indicate the inoperative condition of one or more of the primary lamps, or of a resistance coil connected in the circuit to balance the voltage of the electric current, so as to be clearly visible at a considerable distance from the signal boxes.

The crews of passing street-cars or other employees of the railway company are thus enabled to detect an abnormal condition of the signaling system without close inspection of the signaling boxes and by promptly correcting the same may prevent a complete incapacitation of the system and consequent confusion.

Another object of the invention resides in providing in a signaling system of the type above mentioned, means which prevent derangement of its operating mechanism by a car entering a track-section already occupied by another, and still another object is to provide a signal box of novel construction which in addition to the advantages above referred to is capable of displaying its signals at opposite sides so as to give proper warning of the presence of a car on a switch- or single-track section to the crews of cars approaching from opposite directions.

The above and other objects, all of which will fully appear in the course of the following description, I attain by the construction and combinations of devices which in their preferred form are illustrated in the accompanying drawings in which like characters of reference indicate corresponding parts throughout the several views, in which—

Figure 1 represents a front elevation of one of the signal-boxes comprised in the improved system, Fig. 2, a side elevation of the same, Fig. 3, a section taken on the line 3—3, Fig. 1, Fig. 4, a section along the line 4—4, Fig. 1, Fig. 5, an interior view of one of the signal-boxes with its door in a wide open position, Fig. 6, a plan view of the trolley wires of an electric railway at a single-track section showing the relative position of the contactors and signal boxes and, diagrammatically, the circuits by which they are connected, and Fig. 7, a diagrammatic representation of the electrical devices and connections comprised in the entire system.

Referring more specifically to the drawings, the reference character 2 designates the body-portion of one of the signal boxes used in the system, which is normally closed by a hinged door 3.

The electrical devices included in the system are mounted partially within the body of the box and partially upon the door of the same as shown in Fig. 5.

The signaling system includes two of these boxes each containing series of primary and secondary lamps and the parts of the operating mechanism immediately associated therewith and one of the boxes, that shown in detail in Fig. 5 of the drawings, contains in addition to said parts, the other electrical devices employed in the system as will hereinafter be described.

A horizontal partition 4 divides the body portion of each box into upper and lower lamp-compartments and a transverse partition 5 subdivides the upper compartment into two chambers 6 and 7.

Each of the chambers contains two primary incandescent lamps as best shown in Fig. 3 which are arranged in alinement with lenses 10 and 12 fastened in openings in the opposite sides of the body-portion of the box and its door. The two lenses on each side of the box are respectively red and green and are placed reversely with relation to the lenses in the other side of the box so that each lens of one color is opposite a lens of the other color. Hoods 13 extending outwardly from the box over the lens-openings concentrate the light-rays emitted therethrough.

The lower compartment of the box contains five secondary lamps one of which, 14, is placed in approximately the center of the same while the others are arranged in pairs designated by the numerals 15 and 16, beneath the primary lamps in the upper compartment.

The secondary lamps extend in a plane with lens-openings in the door of the box and the thereto opposite side of the body portion of the same, there being at each side of the box a central elongated opening between two smaller openings.

The last-mentioned openings are covered by lenses 17 and 18 which correspond in color with those of the primary lamps immediately above the corresponding secondary lamps and the central openings are covered by lenses 19 of a distinctive color, preferably white and of translucent material.

Each box contains a resistance coil 20 the ohmic resistance of which is equal to that of any one lamp in the series.

Placed in the circuit of each primary lamp is the coil of an electric magnetic switch 21 which controls the current flow through a shunt around the primary lamp, in which the subjacent secondary lamp is connected, and the coil of a similar switch 22 is placed in the circuit of each resistance coil 20 to control the flow of current through a shunt around the coil in which the central secondary lamp 14 is connected.

In addition to these electrical devices the system contains a selective switch G which automatically switches the current into the lamp circuits corresponding with the contactor engaged by the trolley of a car entering the railway section to which the system is applied, a main switch H controlling the circuits of the entire system, and resistance coils K and M whose principal object is to keep the switches from rebounding and to prevent excessive voltage from passing through their coils in case the circuits in which the switches are connected remain closed during a prolonged period by a continued engagement of the trolley wheel with one of the contactors on the trolley wire when the car to which it is attached is stopped at that particular point, or by other causes.

These additional devices are mounted in one of the two signal boxes as shown in Fig. 5 of the drawings and each box contains, moreover, the usual fuses and the switches which control the connection of their respective electrical devices in the outside circuits.

For clearness of illustration, these switches and fuses have been omitted from the drawings.

Having thus briefly explained the mechanical construction of the signal boxes and the nature of the electrical devices comprised in the signaling system, the operation of the system will now be described with reference to Figs. 6 and 7 of the drawings in which the different circuits and electrical connections are represented by different kinds of lines.

The signal boxes positioned with relation to the track section as shown in Fig. 6, are in their entirety designated by the letters A and B. The contactors which are actuated by cars entering the section (commonly known as the on-contactors) by the reference characters C and D, and the contactors which are engaged by the trolleys of cars leaving the section (the off-contactors), by the letters E and F.

In the illustrations the contactors have been shown at opposite sides of a single track-section of a double track, the trolley wires of which have been designated by the letter T.

The contactors are of a type commonly used on electric railways to complete a circuit by connection with the trolley-wheel. They are fastened in insulated relation to the trolley wires and connected in the ground side of the circuits they control.

The trolley-wheel when engaging the contactor places it in electrical connection with the trolley wire and thereby connects the side of the circuit of which it is a terminal, with the generator of electricity designated in the drawings by the letter V.

The selective switch G of the system consists of two axially alined solenoid coils 23 and 24 the common core 25 of which carries a contact bar 26 which in the positions to which it is moved by alternate energization of the coils, engages two sets of brushes 27 and 28 and provides a path for current between the members of the same.

The main switch H consists of a lever 29 fulcrumed at 30 and operatively connected with the core 31 of a solenoid 32. The lever carries at the end of one of its arms an insulated contact-piece 33 which when the arm is in a lowered position, bridges a gap between two normally separated brushes 34 and thereby closes a circuit of which said brushes are the terminals.

The opposite arm of the lever carries two insulated contact pieces 35 and 36 on a block 37 of nonconducting material, which when the end of the lever is in its lowered position, respectively engages two sets of resilient brushes 38 and 39 to complete the circuits in which they are connected.

The last-mentioned arm of the lever overbalances its other arm so that when the lever is free to turn about its fulcrum, the contact-plates are moved by gravity into engagement with the respective sets of brushes 38 and 39.

A pivoted latch 40 normally prevents the downward motion of the overbalancing arm of the lever.

The latch is connected with the core of a solenoid 42 which when energized moves it to an inoperative position against the action of a return spring 43.

When the signaling system is in its normal condition of rest, i. e. when the railway section to which it is applied is not occupied, the circuits of the several primary electric lamps are open.

The electro-magnets which control the shunts in which the secondary lamps are connected, are in consequence deënergized and the shunts are closed by the engagement of their respective armatures 44 with contact stops 45.

The contact-bar 26 of the selective switch engages under the same conditions with either the brushes 27 or the brushes 28 and the lever of the main switch which controls the light circuits, is in the position maintained by the latch 40 in which the brushes 34 are engaged by the contact-piece 33.

Presuming that a car moving in the direction of the arrow W in Fig. 7 approaches the single track-section of the railway, its trolley engages the contactor C and closes the circuit of the solenoid 23 of the selective switch G to move the contact bar 26 thereof to a position in which it engages the brushes 27, or if it already occupied this position, to hold it there.

The circuit of the solenoid coil thus closed includes beginning at the source of electricity V, the trolley-wire T, the contactor C, the conductor 46, the solenoid coil 23, the conductor 47, the two brushes 34 of the main switch engaged by the contact-piece 33, the conductor 48, the coil 42 of the solenoid which controls the position of the latch 40, and the conductor 49 which connects with the ground.

The engagement of the contact-bar 26 of the selective switch with the brushes 27, closes the circuit of the primary lamps 9 so that the red lenses 12 of the signaling boxes, facing in a direction opposite to that of the approaching cars are illuminated to give notice of the fact that the single-track-section is being entered.

Inasmuch as the opposite lenses of the boxes are of different colors the green lenses 10 on the sides of the signal boxes facing in the direction of the approaching car, are at the same time illuminated to give notice to all cars coming in the same direction, that no cars have entered the section at its opposite end.

The circuit of the primary lamps thus closed, includes the following connections: Beginning at the generator of electricity, the trolley-wire T, the conductor 50, the brushes 39 of the main switch which were engaged by the contact-plate 36 the moment the lever 29 was released by the latch 40 owing to the energization of the solenoid 42, the conductor 51, the brushes 27 of the selective switch, the conductor 52, the filament of one of the lamps 9 in the box A, the conductor 53, the coil of the respective electro-magnet 21, the conductor 54, the filament of the other lamp 9 in the box A, the conductor 55, the coil of the respective electro-magnet 21, the conductor 56, the resistance coil 20 in the box B, the conductor 57, the coil of the electro-magnet 22 in the box B, the conductor 58, one of the lamps 9 in the box B, the conductor 59, the coil of the corresponding electro-magnet 21, the conductor 60, the other lamp 9 in box B, the conductor 61, the coil of the corresponding electro-magnet 21, and a conductor 62 connecting with the ground.

It will be seen that while the primary lamps 9 in the two boxes are thus placed in an incandescent condition the shunts around the lamps, in which the corresponding secondary lamps are connected are at the same time broken.

Immediately after the selective switch had been energized by the engagement of the trolley wheel with the contactor C its circuit was broken in the main switch by disengagement of the contact-piece 33 and the brushes 34 owing to the upward movement of the corresponding arm of the lever due to the retraction of the latch 40 by energization of the solenoid 42, and the opening of the circuit of the selective switch in the main switch brought the resistance coil K in circuit so that the course of current became as follows: the trolley wire, the contactor C, the conductor 46, the coil 23 of the selective switch, the conductor 47, resistance coil K, the shunt wire 63, the conductor 48, the coil of the solenoid 42, and the conductor 49, connecting with the ground.

By reason of the connection of the resistance in the circuit of the selective switch, the armature is held against rebounding and the voltage passing through its coil is reduced.

The coil may thus be maintained in an energized condition for an indefinite period without danger of burning by stoppage of the car or other cause, should the circuit at the contactor C be closed during a prolonged period.

When the car leaves the single track-section, its trolley engages the off-contactor F which closes the circuit of the solenoid 32 of the main switch, as follows: the generator of electricity V, the trolley-wire T, the wire 64 branching at 64ª for connection with the off-contactor E at the opposite end of the track-section, the brushes 38 of the main switch connected by the contact-piece 35, the conductor 65, the coil of the solenoid 32, the conductor 66, and the conductor 49 of the first-described circuit which connects with the ground.

The energization of the coil 32 restores the parts of the main switch to their original condition, and the circuit of the primary lamps 9 which was closed therein, is in consequence reopened by separation of the contact-piece 36 from the brushes 39. The circuit controlled by the off-contactor F as traced hereinbefore, is also broken in the main switch by the disengagement of the contact-piece 35 and the brushes 38, and the resistance coil M is connected in the circuit as follows: commencing at the trolley-wire, the conductor 64, the shunt-wire 67 in which the resistance coil is connected, the conductor 65, the coil of the solenoid 32 and the conductors 66 and 49 the latter of which connects with the ground.

The inclusion of the resistance M in the circuit causes the solenoid 32 to stick at a reduced voltage, thereby permitting it to complete the adjustment of the moving parts of the main switch to their original condition. Burning of the coil of the solenoid is at the same time prevented in case its circuit remains closed during a prolonged period by a continued stoppage of the trolley in engagement with the contactor F or in case of short circuiting.

As soon as the contactor F is disengaged by the trolley, the coil 32 and the resistance M are deënergized thereby restoring all the parts of the system to their original conditions.

A car entering the section from the opposite direction closes the circuit of the coil 24 of the selective switch G by engagement with the contactor D, as follows: the generator of electricity, the trolley-wire, the contactor D, the conductor 68, the coil 24 of the selective switch, the conductor 69, the conductor 47 of the first-described circuit, the brushes 34 engaged by the contact-plate 33, the conductor 48, the coil 42 of the latch retracting solenoid and the conductor 49 which connects with the ground.

The before described operation of the system is repeated and the primary lamps 8 are lighted while the shunts in which the corresponding secondary lamp 16 and those corresponding with the resistance coils 20 are connected, are opened by energization of their respective electro-magnets. The path of the current in this case is as follows: the generator of electricity, the trolley-wire, the conductor 50, the brushes 39 engaged by the contact-piece 36 in the main switch, the conductor 51, the brushes 28 of the selective switch engaged by the contact-bar 26 of the armature of the solenoid 24, the conductor 70, the resistance coil 20, the conductor 71, the electro-magnet 22, the conductor 72, the filament of one of the lamps 8 in the signal-box A, the conductor 73, the coil 21 controlling the shunt around said lamp, the conductor 74, the filament of the other lamp 8 in the box A, the conductor 75, the electro-magnet 21 controlling the shunt around the last-mentioned lamp, the conductor 76, the filament of one of the lamps 8 in the signal box A, the conductor 77, the solenoid 21 controlling the shunt around said lamp in which the corresponding lamp 15 is connected, the conductor 78, the filament of the other lamp 8 in the box B, the conductor 79, the corresponding solenoid coil 21, and the conductor 80 connecting with the ground.

It will thus be seen that upon a car entering the single track- or switch-section of the railway at either end, the red lenses on the sides of the signal boxes facing the opposite direction, and the green lenses on the opposite sides of the same, will be illuminated until the car leaves the section when all the lamps are extinguished and the parts of the operating mechanism return automatically to their normal condition.

If by accident or by negligence of a motorman a car should enter the section after it has been entered by a car running in the opposite direction, the lamps in the signal boxes remain in the condition in which they were placed by engagement with the trolley-wheel of the first-entering car with the respective on-contactor, by reason of the fact that the circuit of the latch controlling solenoid 42 remains broken until the car by engagement with the off-contactor at the opposite end of the section restores the mechanism to its original inactive condition.

In the event that any one or more of the primary lamps or one or both of the resistance-coils 22 are broken, or the current flow through their conductive parts is otherwise disturbed, the corresponding secondary lamp or lamps are automatically brought in circuit by deënergization of the respective electro-magnets and the consequent closing of the shunts in which they are connected.

Inasmuch as the lenses of the lower lamp-compartments of the boxes correspond with those of the respective upper compartments, the signal boxes will thus continue to give the proper warning to approaching cars and at the same time indicate an irregularity in the operation and the condition of one or more of its operating parts by emitting a light through the distinctively colored central lenses 19.

In case one or both of the resistance coils are broken, the respective secondary lamp or lamps opposite the central lenses will be lighted while one of the two sets of primary signal lamps are in an incandescent condition as before.

The secondary lamps corresponding with the defective primary lamps or resistance coils will be brought to an incandescent condition each time the system is subsequently actuated until the broken parts have been restored to their normal condition.

Presuming, for example, that the filament of one of the primary lamps 8 in box B is ruptured and a car entering the railway section in a direction opposite to that indicated by the arrow W engages the on contact D, the break in the circuit of the lamp will cause the corresponding electro-magnet 21 to remain in a deënergized condition in which the shunt circuit it controls is closed by the engagement of the conductive end of the armature 44 with the respective contact-stop 45.

The course of the current in this case will include, beginning with the part of the conductor 78 leading from the electro-magnetic coil in the shunt around the other lamp 8 in the box B, the conductor 81, the filament of the secondary lamp 15, the conductor 82, the contact stop 45, the conductive part 44 of the armature of the electro-magnet, and the conductor 83 which connects with the ground wire.

Should the resistance coil 20 of the box A be broken, the corresponding lamp 14 will be brought in circuit by a flow of current along a path which commencing with the conductor 70 leading from one of the brushes 28 of the selective switch includes the conductor 84, the filament of the lamp 14, the conductor 85, the contact-stop 45 of the deënergized electro-magnet 22, the therewith engaging conductive part of the corresponding armature 44, and the conductor 86 which connects with the wire 72 passing to the next electro-magnet.

It will be understood that the function of the resistance coils 20 is to compensate for the difference between the total voltage of the four standard lamps connected in series in their respective circuits and the standard voltage of the circuit which usually is equal to the combined voltage of five standard lamps.

Having thus described my invention what I claim and desire to secure by Letters-Patent is:

1. In a signaling system of the character described, a primary lamp, a secondary lamp, a casing having separate compartments for the lamps, and lenses of different colors in front of the same, circuits in which said lamps are separately connected, means for opening and closing the circuit of the primary lamp by action of a moving railway car, and an electro-magnetic switch which is operatively connected in the circuit of the primary lamp and controls the current flow through the circuit of the secondary lamp to close the same when said switch is in a deënergized condition.

2. In a signaling system of the character described, a primary lamp, a secondary lamp, a casing having separate compartments for the lamps, a lens in a side of the compartment of the primary lamp, lenses of different colors one of which corresponds with that of the primary lamp, in the corresponding side of the compartment of the secondary lamp, circuits in which said lamps are separately connected, means for opening and closing the circuit of the primary lamp by action of a moving railway car, and an electro-magnetic switch which is operatively connected in the circuit of the primary lamp and controls the current flow through the circuit of the secondary lamp to close the same when said switch is in a deënergized condition.

3. In a system of the character described, a signal-box divided into compartments, lenses of dissimilar colors in a side of one compartment, lenses of corresponding colors in the same side of another compartment, a dissimilar lens between the last-mentioned lenses, primary lamps alined with the lenses of the first-mentioned compartment, secondary lamps correspondingly placed, with respect to the first-mentioned lenses, in the other compartment, circuits in which the lamps are separately connected, means for opening and closing the circuits of the primary lamps by action of a moving railway car, and electro-magnetic switches which are operatively connected in the circuits of the primary lamps and control the current flow through the circuits of the corresponding secondary lamps to close the same when said switches are in a deënergized condition.

4. In a system of the character described, colors in opposite ends of another compartlenses of dissimilar colors in opposite ends of one compartment, lenses of corresponding colors in opposite ends of an other compartment, said lenses being arranged reversely with respect to those in the opposite side of said compartments, lenses of a distinctive character between the lenses in the sides of the last-mentioned compartment, primary lamps alined with the lenses of the first-mentioned compartment, secondary lamps correspondingly placed, with respect to the first-mentioned lenses, in the other compartment, circuits in which the lamps are separately connected, means for opening and closing the circuits of the primary lamps by action of a moving railway car, and electromagnetic switches which are operatively connected in the circuits of the primary lamps and control the current flow through the circuits of the corresponding secondary lamps to close the same when said switches are in a deënergized condition.

5. In a system of the character described, a signal-box divided into compartments, a colored lens in a side of one compartment, a lens of a similar color in the same side of the other compartment, a primary lamp behind the lens in the first-mentioned compartment, a secondary lamp behind the lens in the other compartment, circuits in which the lamps are separately connected, means for opening and closing the circuit of the primary lamp by action of a moving railway car, and an electro-magnetic switch operatively connected in the circuit of the primary lamp and controlling the circuit of the secondary lamp to close the same when said switch is in a deënergized condition.

6. In a system of the character described, a signal-box divided into compartments, a colored lens in a side of one compartment, a lens of a similar color and a dissimilar lens in the same side of the other compartment, a lamp behind the lens in the first-mentioned compartment, a lamp behind each of the lenses in the second compartment, a circuit for said first lamp, means for opening and closing the circuit by the action of a moving railway car, a resistance coil in the circuit, shunts around the lamp and the coil, said lamps in the second mentioned compartment connected in said shunts, and electro-magnetic switches operatively connected in the circuit with the first-mentioned lamp and the resistance coil, and controlling the shunts to close the same when said switches are in a deënergized condition, one of the lamps in the second compartment being alined with the lens corresponding with that of the first compartment.

In testimony whereof I have affixed my signature.

WILLIAM C. H. WEFEL.